United States Patent [19]
Hess et al.

[11] Patent Number: 6,097,116
[45] Date of Patent: Aug. 1, 2000

[54] TURBO-GENERATOR

[75] Inventors: Stephan Hess, Bad Säckingen, Germany; Reinhard Joho, Küttigen; Jens von Wolfersdorf, Untersiggenthal, both of Switzerland; Hans Zimmermann, deceased, late of Mönchaltorf, Switzerland, by Verena Zimmermann, heiress

[73] Assignee: ABB Research Ltd., Zurich, Switzerland

[21] Appl. No.: 09/137,680

[22] Filed: Aug. 21, 1998

[30] Foreign Application Priority Data

Aug. 23, 1997 [DE] Germany ............... 197 36 785

[51] Int. Cl.[7] ................................... H02K 1/32
[52] U.S. Cl. .................. 310/61; 310/62; 310/58
[58] Field of Search ............... 310/52, 55, 57, 310/58, 59, 61, 62, 63, 64, 65

[56] References Cited

U.S. PATENT DOCUMENTS

| | | | |
|---|---|---|---|
| 1,022,021 | 4/1912 | Farquhar | 310/65 |
| 2,862,121 | 11/1958 | Ringland | 310/59 |
| 4,264,834 | 4/1981 | Armor et al. | 310/59 |
| 4,379,975 | 4/1983 | Kitajima | 310/59 |

FOREIGN PATENT DOCUMENTS

| | | |
|---|---|---|
| 07039076A1 | 10/1996 | European Pat. Off. . |
| 1099213 | 8/1955 | France . |
| 869241 | 3/1953 | Germany . |
| 935442 | 11/1955 | Germany . |
| 1058619 | 6/1959 | Germany . |
| 1897474 | 7/1964 | Germany . |
| 3323595A1 | 2/1984 | Germany . |
| 4032944A1 | 6/1991 | Germany . |
| 4242132A1 | 6/1994 | Germany . |
| 19606146A1 | 8/1997 | Germany . |
| 373810 | 1/1964 | Switzerland . |
| 389313 | 3/1933 | United Kingdom . |
| 730515 | 5/1955 | United Kingdom . |

Primary Examiner—Nestor Ramirez
Assistant Examiner—Judson H. Jones
Attorney, Agent, or Firm—Burns, Doane, Swecker & Mathis, L.L.P.

[57] ABSTRACT

In a turbo-generator (10) having a rotor (11) and a stator (12) concentrically surrounding the rotor (11) and separated from the rotor (11) by an air gap (14), and also having a cooling arrangement in which a main fan (33) draws in a gaseous cooling medium flowing through corresponding cooling passages in the rotor (11) and in the stator (12) and forces it through a cooler (22, 23, 24) back into the cooling passages, the cooling medium flowing through the rotor (11) in the axial direction, issuing in a heated state into the air gap (14) and being returned from the air gap (14) to the main fan (33), improved rotor cooling is achieved in that the cooling medium heated by the rotor (11) is directed radially outward from the air gap (14) through outflow passages (15) in the stator (12) and is returned to the main fan (33) outside the stator (12) via a cooling-air return (21).

15 Claims, 6 Drawing Sheets

TURBO-GENERATOR

BACKGROUND OF THE INVENTION

1. Field of the Invention

The present invention relates to the field of dynamoelectric machines. It relates to a turbo-generator having a rotor and a stator concentrically surrounding the rotor and separated from the rotor by an air gap, and also having a cooling arrangement in which a main fan draws in a gaseous cooling medium flowing through corresponding cooling passages in the rotor and in the stator and forces it through a cooler back into the cooling passages, the cooling medium flowing through the rotor in the axial direction, issuing in a heated state into the air gap and being returned from the air gap to the main fain.

Publication U.S. Pat. No. 4,379,975, for example, discloses such a turbo-generator.

2. Discussion of Background

To ensure trouble-free operation and to utilize the full output potential, large turbo-generators must be cooled in order to dissipate the heat loss which occurs in the windings and cores of the rotor and stator. A gaseous medium such as air or even hydrogen is usually used for the cooling and is fed through corresponding bores or slits in the rotor and stator and then cooled down again in a cooler. In this case, the winding overhangs of the stator winding, at which an especially large heat loss occurs on account of the conductor geometry and the leakage field associated with it, warrant special attention. If the cooling medium flowing through the rotor and stator is in the process drawn out of the cooling region by main fans sitting on the ends of the rotor and forced into the cooling region again via a downstream cooler, the term "reverse flow cooling" is used.

In the rotor, the cooling medium flows axially from the ends into corresponding bores of the rotor conductor toward the inside, issues radially into the air gap between stator and rotor after absorbing the rotor heat loss, and flows axially in the air gap outward to the main fans again. In this case, the cooling medium issuing from the rotor has a markedly higher temperature than the stator, in particular in the end regions of the rotor as well.

The air gap between rotor and stator is dimensioned to be comparatively narrow, so that a relatively high flow resistance results for the rotor cooling, and this flow resistance hinders the circulation of the cooling medium and thus limits the cooling effect. In addition, the cooling medium heated to a relatively high degree in the rotor gives off heat to the stator when passing or striking the stator bore, as a result of which the cooling of the stator is impaired.

In the publication mentioned at the beginning, it is proposed to attach a short, annular air-gap cylinder piece in the air gap in the end region of the stator, which air-gap cylinder piece, on the rear side, is subjected to a flow of gas from a plurality of radial slits in the stator and, on the front side, prevents the flow of relatively hot gas issuing from the end region of the stator from striking the inner surface of the stator bore or deflects said flow of gas. Although the adverse effect of the cooling gas, heated to an especially high degree, from the winding-overhang region of the rotor on the stator is avoided or reduced by restricting the air-gap cylinder piece to the end regions of the stator, the remaining region of the stator is nonetheless subjected to the relatively hot cooling medium flowing in the air gap, so that the cooling is more likely to be impaired precisely in the stator region close to the axis, where the stator windings are located. In particular, the circulation of the cooling medium through the rotor will be made worse rather than improved by this measure.

SUMMARY OF THE INVENTION

Accordingly, one object of the invention is to provide a novel turbo-generator which is distinguished by improved cooling of the rotor and at the same time permits thermal isolation of the cooling of rotor and stator in a simple manner.

This object is achieved in a turbo-generator of the type mentioned at the beginning in that the cooling medium heated by the rotor is directed radially outward from the air gap through outflow passages in the stator and is returned to the main fan outside the stator via a cooling-air return. By the cooling medium which issues from the rotor being returned according to the invention from the air gap via radial outflow passages in the stator, the circulation of the cooling medium through the rotor can be optimized independently of the air gap.

A first preferred embodiment of the turbo-generator according to the invention is distinguished by the fact that separating means are arranged inside the outflow passages and prevent the heated cooling medium directed outward through the outflow passages from coming into contact with the stator, and that the separating means are laminated separating cores oriented transversely to the axis of the turbo-generator and comprise distance webs, oriented normal to the axis of the turbo-generator, between the laminated separating cores. The separating means prevent the flows of the relatively hot cooling medium from the rotor from giving off heat to the stator and thus impairing the cooling of the stator when said flows are being returned to the main fan. The construction is considerably simplified by the use of laminated separating cores as separating means, since the laminated separating cores can be constructed in the same way as the stator lamination itself and are a component of the magnetic circuit. Owing to the fact that the distance webs which are necessary anyway for the formation of the outflow passages are at the same time used as separating means, further simplification is obtained.

A second preferred embodiment of the turbo-generator according to the invention is distinguished by the fact that radial inflow slits, through which cooling medium for cooling the stator flows in from the outside to the inside, are arranged in the stator between the outflow passages, and that bores are arranged in the stator yoke and cooling passages are arranged in the stator tooth, which bores and cooling passages, running transversely to the inflow slits and outflow passages, in each case connect adjacent inflow slits and outflow passages to one another. In this way, the outflow passages which exist for returning the cooling medium from the rotor can at the same time also be used in a simple manner for returning the cooling medium flowing through the stator from the inside to the outside. If no separating means are provided in the outflow passages, the two cooling-medium flows from the rotor and stator combine there.

In a preferred development of this embodiment, however, separating means are arranged inside the outflow passages, which separating means prevent the heated cooling medium which comes from the rotor and is directed outward through the outflow passages from coming into contact with the stator and which comprise laminated separating cores oriented transversely to the axis of the turbo-generator. The laminated separating cores are at a distance from the walls of the stator and form cooling slits between themselves and the walls. The bores in the stator yoke and the cooling passages in the stator tooth in each case lead into the cooling slits at their ends facing the outflow passages. In this way, the cooling-medium flows from rotor and stator are returned separately from one another in the outflow passages, so that the mutual thermal influence is minimized with little design cost.

Another preferred embodiment of the turbo-generator according to the invention is distinguished by the fact that the cooling slits and the inflow slits are connected to the preliminary stator slots at their ends close to the axis, that the preliminary stator slots are closed off flush from the air gap by closure means and form cooling passages through which the cooling medium flows, that the inflow slits are closed off flush toward the air gap in each case by a first insert piece, and that the cooling slits of each outflow passage are closed off toward the air gap by a second insert piece which has the form of an, open rectangular profile having edges rounded off toward the inside. The cooling of the stator is further improved in the region of the stator tooth by the inclusion of the preliminary stator slots as cooling passages. At the same time, the surface friction losses of the rotor are minimized by the flush closure toward the air gap.

Further embodiments follow from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
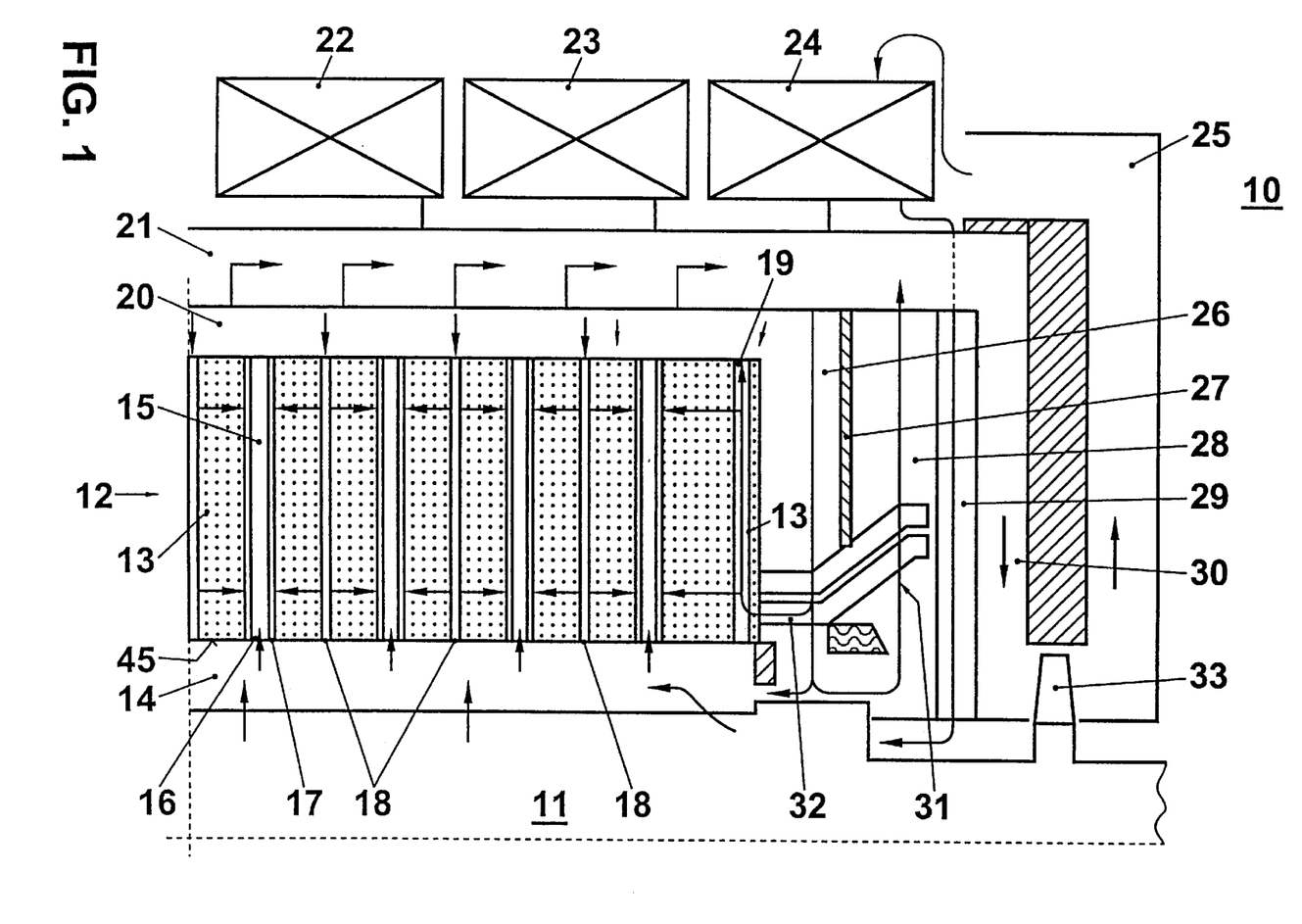
FIG. 1 shows a first preferred exemplary embodiment of the invention in a schematic longitudinal section of the one side of the turbo-generator.

Referring now to the drawings, wherein like reference numerals designate identical or corresponding parts throughout the several views, a first preferred exemplary embodiment of the invention is reproduced in FIG. 1 in a schematic longitudinal section of the one side of the turbo-generator. The turbo-generator 10 comprises a rotor 11 which is rotatably mounted about an axis and is concentrically surrounded by a stator 12. At the end, the rotor 11 internal construction and winding of which is not shown, carries a main fan 33, which draws in (reverse flow cooling) a gaseous cooling medium (air or $H_2$), which circulates through the rotor 11 and stator 12, via a return passage 30 and forces it via a cooler passage 25 through a number of coolers 22, 23 and 24, in which heat absorbed in the rotor 11 and stator 12 is extracted again from the cooling medium. The cooled-down cooling medium is then divided and fed by various routes through the rotor 11 and stator 12 in order to absorb and draw off the heat loss which occurs there in the windings and cores during operation of the turbo-generator 10.

A first partial flow of the cooling medium is directed via a cooling-air feed 29 to the rotor 11 and is introduced there axially in order to cool the rotor winding overhang and the rotor winding (for the details see, for example, publication U.S. Pat. No. 4,379,975 mentioned at the beginning). The cooling medium heated in the rotor 11 issues radially into the air gap 14 between rotor 11 and stator 12 and is directed radially outward there via a multiplicity of outflow passages 15 distributed over the stator length, is collected in a cooling-air return 21 lying outside the stator 12, and is directed via the return passage 30 back to the main fan 33. The transfer of the cooling medium from the outflow passages 15 into the cooling-air return 21 is effected via a chamber system, which is not explicitly shown in FIG. 1.

A second partial flow of the cooling medium flows out of one of the coolers 22–24 into that space of the stator 12 in which the stator winding overhang 31 of stator winding 32 overhangs freely and which is divided by a partition 27 into a feed region 26 and a discharge region 28. The cooling medium enters the feed region 26, flows around the stator winding overhang 31 and is split into three partial flows (see the flow arrows depicted), of which the first enters the stator yoke 13 laterally and is directed radially outward through a marginal cooling slit 19 in the stator yoke 13; the second enters the air gap 14 and passes outward through the outflow passages 15 together with the cooling-medium flow issuing from the rotor 11; and the third is deflected into the discharge region 28, flows around the stator winding overhang 31 a second time and is returned into the cooling-air return 21.

Further partial flows from the coolers 22–24 are distributed over a multiplicity of inflow slits 18 by a chamber system (not shown) of a cooling-air feed 20, the inflow slits 18 leading radially from the outside to the inside in the stator 12 and being arranged between the outflow passages 15. In the inflow slits 18, the cooling medium flows toward the air gap 14; however, it does not enter the air gap 14, since the inflow slits 18 are closed off toward the air gap 14, but flows in cooling passages (arrows in FIG. 1) which are provided transversely to the inflow slits 18 in the stator 12 to the adjacent outflow passages 15, and from there outward back into the cooling-air return 21. In this case, the cooling-medium flows from the rotor 11 and the stator 12 into the outflow passages 15 are directed separately. Laminated separating cores 16, 17, the construction and arrangement of which are described in more detail below, are used to separate the cooling-medium flows.

Figure 2:
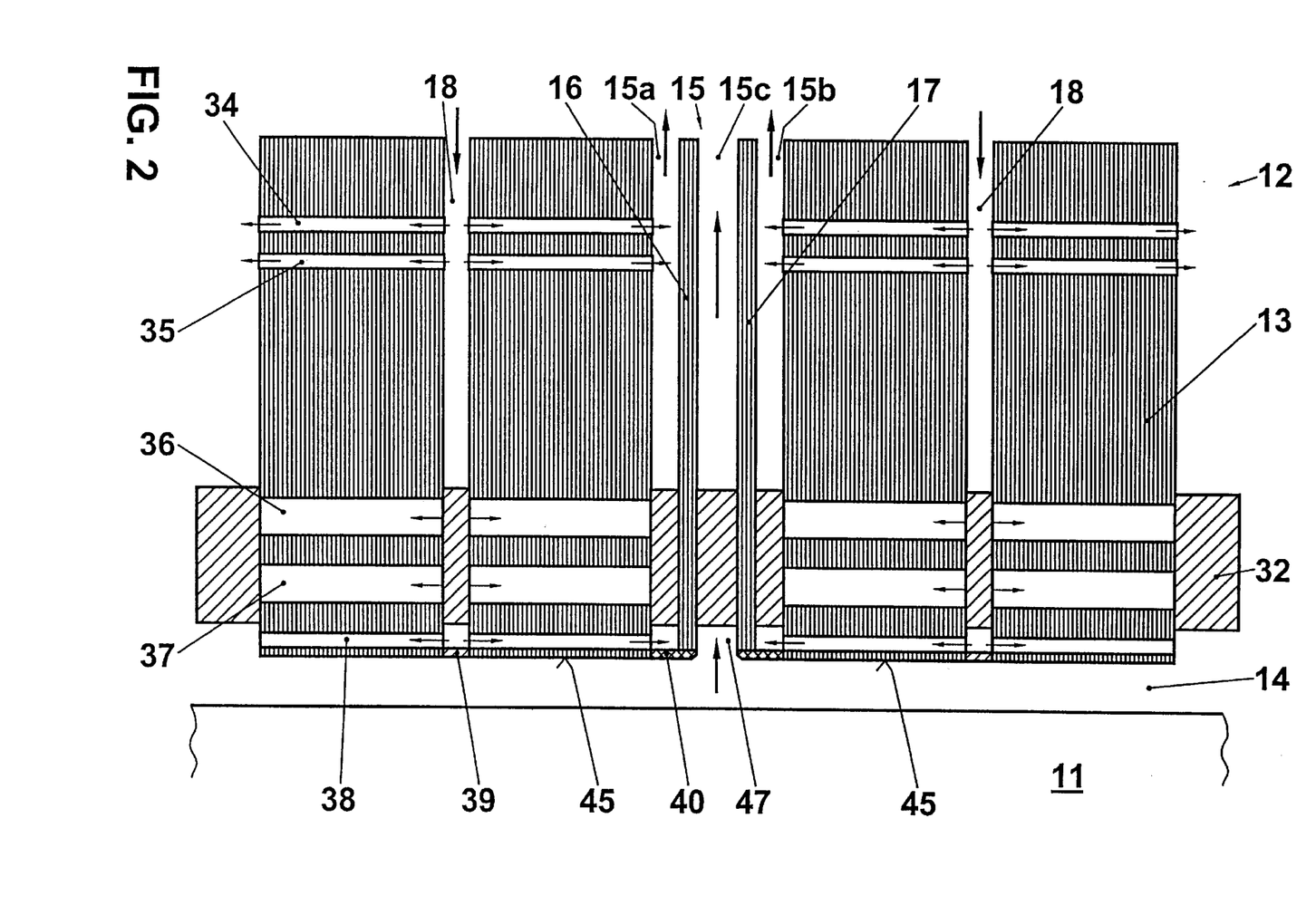
FIG. 2 shows an enlarged detail from FIG. 1 for better representation of the various cooling passages in the stator.

The directing of the flows of the cooling medium in the stator 12 can be seen from the representation in FIG. 2, which reproduces an enlarged detail of the stator region from FIG. 1. The detail comprises an outflow passage 15 and two adjacent inflow slits 18. The outflow passage 15 contains two laminated separating cores 16 and 17, which are in each case at a distance from the wall of the outflow passage 15 and from one another. A central passage 15c and two laterally adjacent, separate cooling slits 15a and 15b are thereby formed in the outflow passage 15. The central passage 15c is open toward the air gap 14. The cooling medium coming from the rotor 11 and heated to a relatively high degree flows outward through the central passage 15c without coming into contact with the walls of the stator 12.

Bores 34, 35 are arranged in a distributed manner about the generator axis in the stator yoke 13. In the stator tooth, i.e. in that region of the stator 12 which contains the slots and preliminary slots for accommodating the stator winding 32, cooling passages 36, 37 are arranged between the stator slots, and these cooling passages 36, 37—like the bores 34, 35—running transversely to the inflow slits 18 and outflow passages 15, connect respectively adjacent inflow slits 18 and outflow passages 15a, 15b to one another. At their ends facing the outflow passages 15, the bores 34, 35 in the stator yoke 13 and the cooling passages 36, 37 in the stator tooth in each case lead out into the cooling slits 15a, b. The cooling slits 15a, b are closed off toward the air gap by an insert piece 40 having edges rounded off toward the inside. The inflow slits 18 are closed off flush toward the air gap 14 by corresponding insert pieces 39. A flush stator bore 45, which minimizes the surface friction losses of the rotor 11 in the air gap 14, is thus obtained. In the configuration according to FIG. 2, the cooling medium cooling the stator 12 enters the inflow slits 18, flows through the bores 34, 35 and cooling passages 36, 37 to the adjacent cooling slits 15a, b and issues again there from the stator 12 toward the outside. In this case, the arrangement, number and cross section of flow of the bores 34, 35 and cooling passages are selected in such a way that the stator 12 is also cooled to a varying degree of intensity in regions where heating takes place to a varying degree of intensity. The preliminary stator slots 38, which are connected to both the inflow slits 18 and the cooling slits 15a, b, are also used for the cooling.

Figure 3:
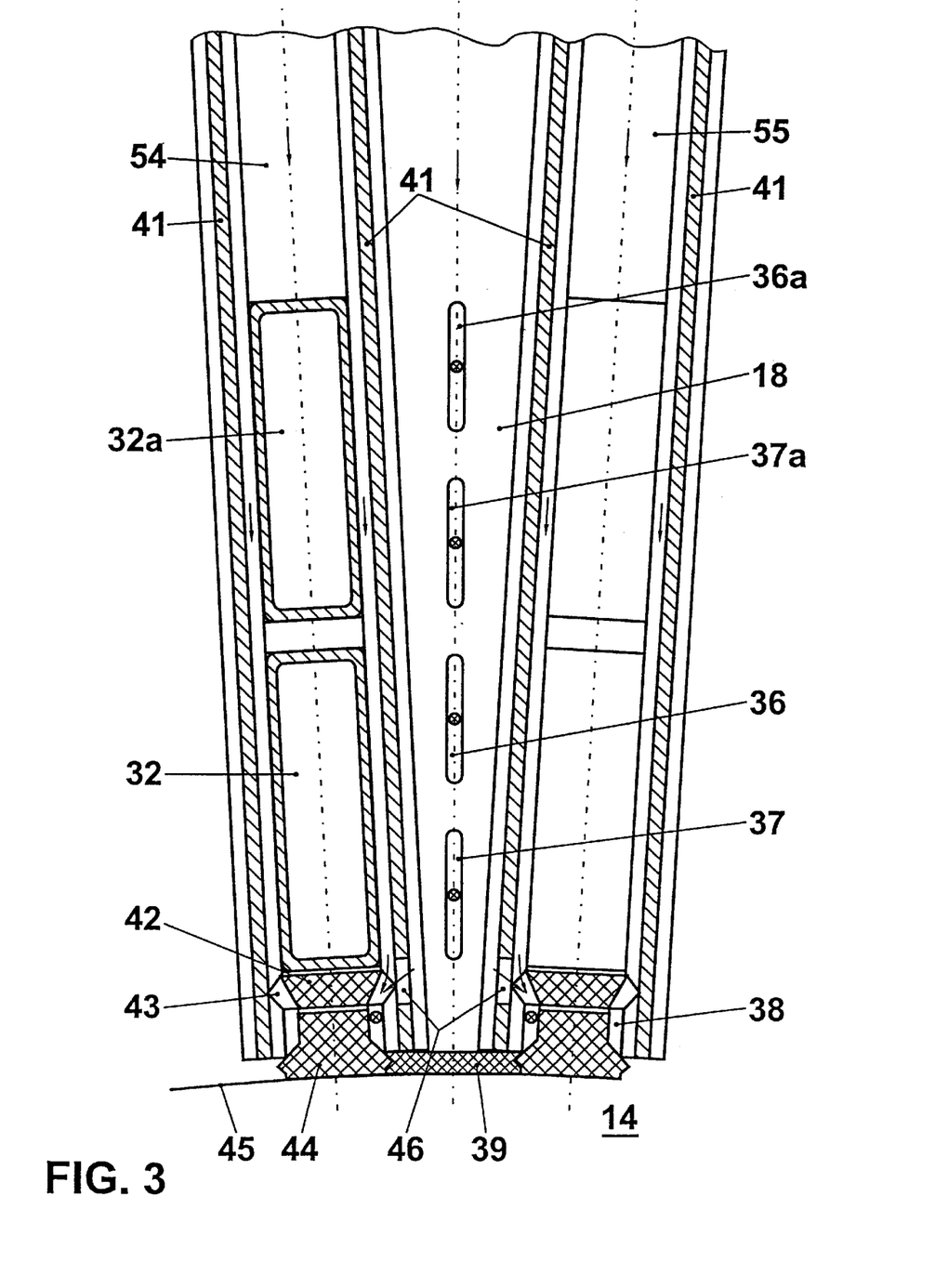
FIG. 3 shows, in a cutaway longitudinal section, the construction in the region of the stator tooth of a preferred exemplary inflow slit, as can be used in the turbo-generator according to the invention.

In a longitudinal section through one of the inflow slits (18 in FIG. 2), a preferred exemplary embodiment for the construction of such an inflow slit is shown in FIG. 3. To separate the adjacent laminated cores of the stator yoke, distance webs 41 are arranged in each case on both sides of the stator slots 54, 55, in which the stator winding 32, 32a is accommodated, and these distance webs 41 form the side walls of the inflow slit 18 between the stator slots 54, 55. The cooling passages 36, 37 and 36a, 37a respectively, which have an elongated cross section for optimizing the cooling effect, branch off laterally from the inflow slit 18. The preliminary stator slots 38, which are actually separated from the inflow slit 18 by the distance webs 41, are connected to the inflow slit 18 by corresonding openings 46 in the separating distance webs. The slot wedges 42, with which the windings 32, 32a are fixed in the stator slots 54, 55, are provided with bevels 43 in order to permit an unimpeded flow of the cooling medium from the inflow slit 18 through the openings 46 as well as from the stator slots 54, 55 into the preliminary stator slots 38. The preliminary stator slots 38 are closed toward the air gap 14 by displacement bodies 44, which on the one hand ensure a flush surface of the stator bore 45 and on the other hand, by reducing the cross-sectional area, increase the velocity of flow of the cooling medium in the preliminary stator slots 38 and thus the cooling effect.

Figure 4:
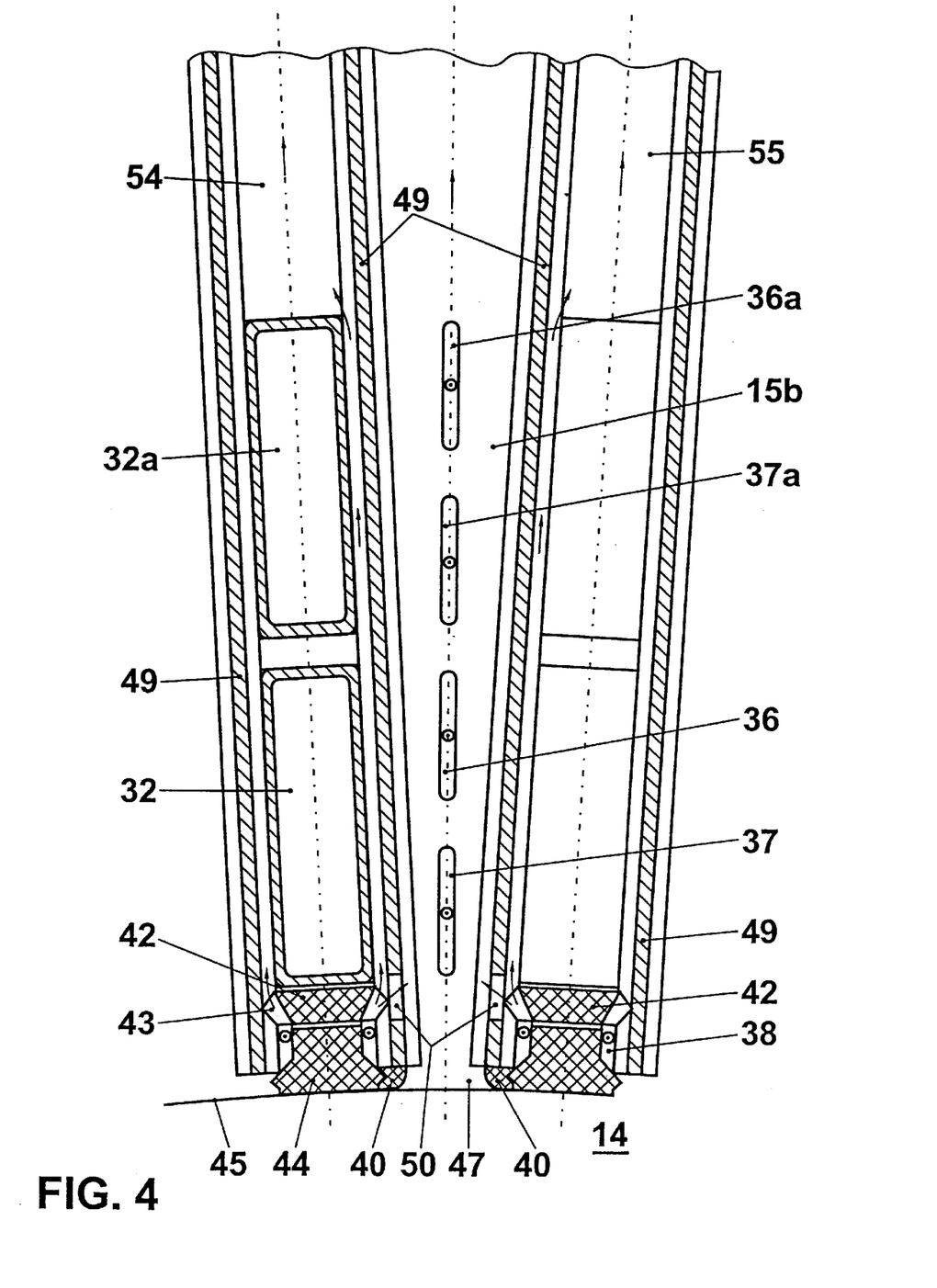
FIG. 4 shows, in a longitudinal section corresponding to FIG. 3, the construction in the region of the stator tooth of a preferred exemplary outflow passage, as can be used in the turbo-generator according to the invention.

The longitudinal section through the cooling slits (e.g. 15b in FIG. 2) which corresponds to FIG. 3 is reproduced in FIG. 4. Here, too, distance webs 49 are arranged on both sides of each stator slot 54, 55 between the wall of the outflow passage 15 or of the stator 12 and the first laminated separating core, and these distance webs 49 form the side walls of the cooling slit 15b between the stator slots 54, 55. The cooling passages 36, 37 and 36a, 37a lead into the cooling slit 15b. Here, too, in order to provide a connection between the cooling slit 15b and the preliminary stator slots 38, openings 50 are provided in the separating distance webs 49. The edges of the insert piece 40, which are rounded off toward the inside and ensure a low-loss inflow of the cooling medium from the air gap 14 into the cooling slit 15b, can also be clearly seen in FIG. 4. Furthermore, it can clearly be seen that the cooling slit 15b has a cross section increasing toward the outside (top). A diffuser effect, which leads to a desired pressure increase, is thereby achieved.

Figure 5:
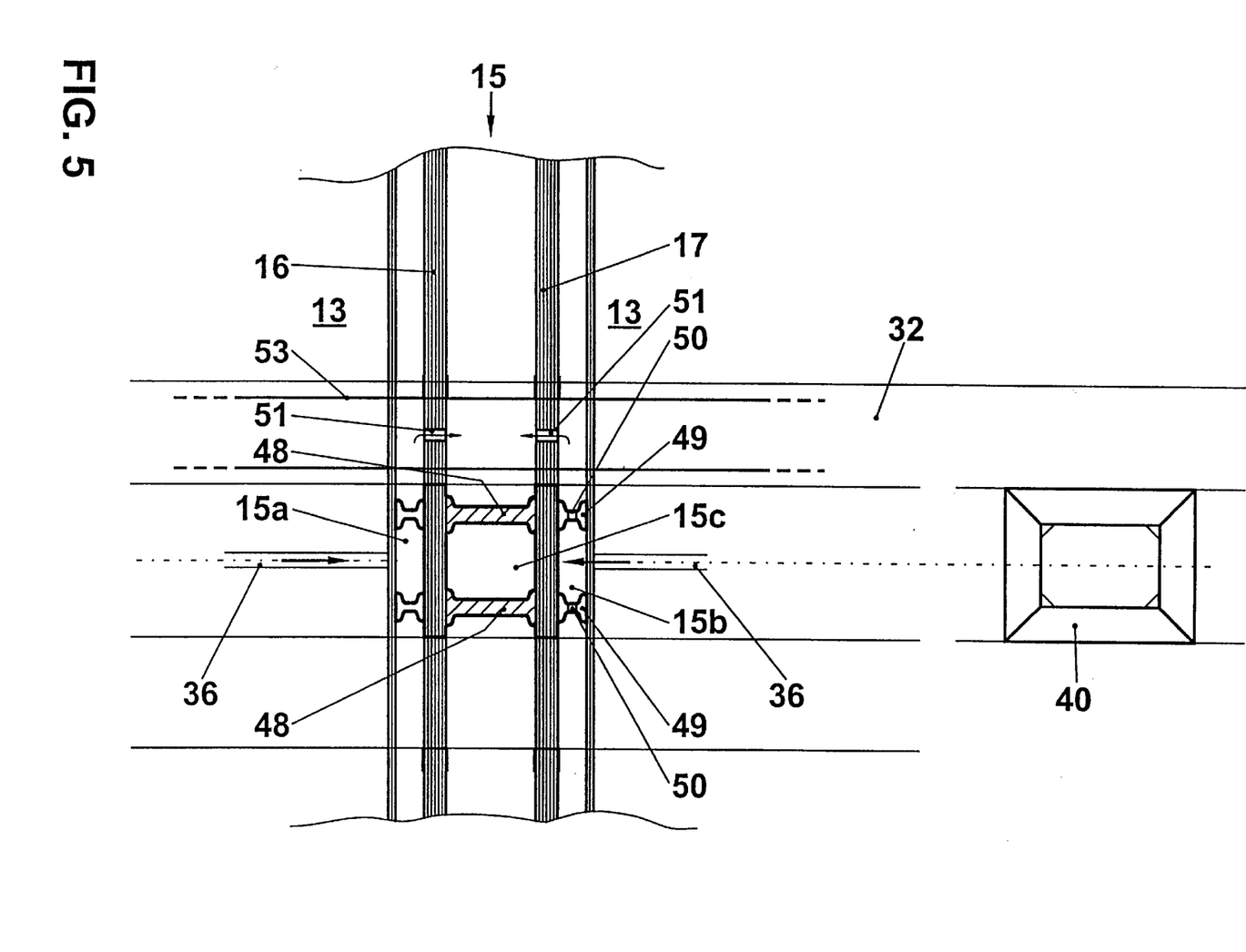
FIG. 5 shows the cutaway cross section through the outflow passage according to FIG. 4 with additional openings in the laminated separating cores for evening out the flow.
Figure 6:
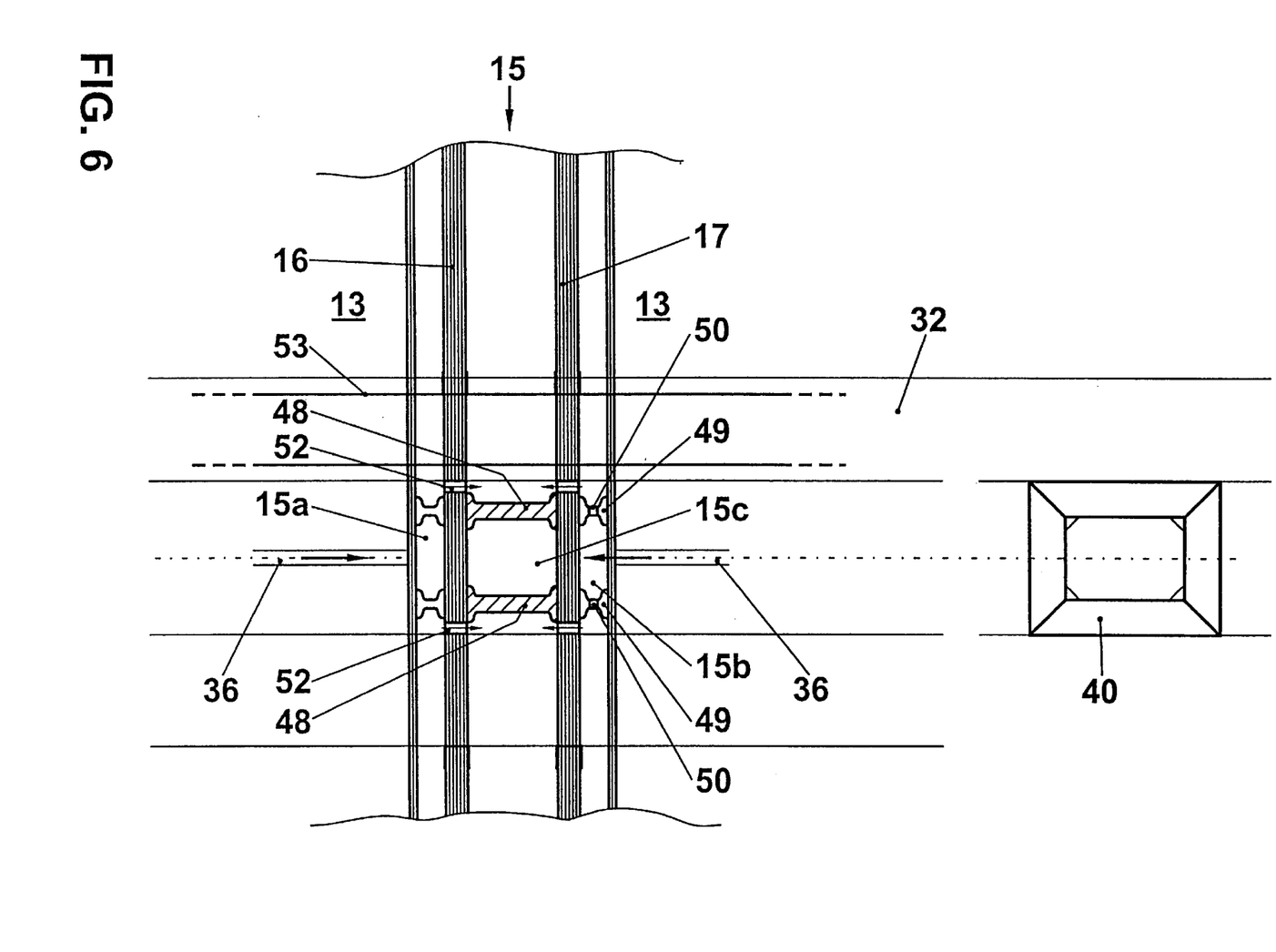
FIG. 6 shows a cross section of a variant of FIG. 5, in which additional slits for directing the cooling medium in the proximity of the conductors are formed by appropriate machining of the laminated separating cores.

The cross section through an outflow passage 15 according to FIG. 4 is shown in FIGS. 5 and 6. In addition to the distance webs 49 which form the side walls of the cooling slits 15a, b, the distance webs 48 which are arranged between the laminated separating cores 16, 17 and form the side walls of the central passage 15c can also be seen here. The insert piece 40 is also shown by way of example in both figures (for an adjacent outflow passage). In the exemplary embodiment of FIG. 5, openings 51 through which the cooling medium can pass are provided in the laminated separating cores 16, 17 for evening out the flow. In the exemplary embodiment of FIG. 6, the laminated separating cores 16, 17, in the region of the conductors 53 of the stator winding 32, have slots through which the conductors 53 are run and whose width is selected in such a way that slits 52 for the circulation of the cooling medium remain free between the conductors 53 and the laminated separating cores 16, 17. Consequently, the laminated separating cores—unlike the other laminated cores of the stator 12—are mechanically, electrically and in particular thermally isolated from the conductors 53 of the stator winding 32. The cooling medium can pass through the resulting narrow slits 52 and additionally cool the conductor 53. Furthermore, the possibly high electrical losses in the laminated separating cores 16, 17 are not tranferred to the conductors 53.

Obviously, numerous modifications and variations of the present invention are possible in light of the above teachings. It is therefore to be understood that, within the scope of the appended claims, the invention may be practiced otherwise than as specifically described herein.

What is claimed is:

1. A turbo-generator comprising:

a rotor having cooling passages therein and defining an axial direction;

a stator concentrically surrounding the rotor and separated from the rotor by an air gap, said stator having cooling passages and outflow passages;

a cooling arrangement including a main fan, a cooler, and a cooling medium return, the cooling arrangement including flow passages configured and arranged with said main fan to serially draw a gaseous cooling medium flowing through said rotor and stator cooling passages into said fan, force said gaseous cooling medium from said fan through said cooler, and to force said gaseous cooling medium from said cooler back into the rotor and stator cooling passages, the cooling arrangement flow passages being configured to direct cooling medium through the rotor in the rotor axial direction, said cooling medium issuing in a heated state into the air gap and being returned from the air gap to the main fan by said cooling arrangement flow passages, wherein the cooling arrangement flow passages and main fan direct the cooling medium heated by the rotor radially outward from the air gap through said stator outflow passages and to the main fan outside the stator through the cooling medium return.

2. The turbo-generator in accordance with claim 1, further comprising separating means arranged inside the outflow passages to prevent the heated cooling medium directed outward through the outflow passages from coming into contact with the stator.

3. The turbo-generator in accordance with claim 2, wherein the separating means comprises:

laminated separating cores oriented transversely to the axis of the turbo-generator; and distance webs oriented normal to the axis of the turbo-generator between the laminated separating cores.

4. The turbo-generator in accordance with claim 1, wherein the outflow passages are formed with a passage cross section increasing toward the outside.

5. The turbo-generator in accordance with claim 1, wherein said stator includes a yoke and a tooth, and further comprising:

radial inflow slits arranged in the stator between the outflow passages through which cooling medium for cooling the stator flows in from the outside to the inside.

6. The turbo-generator in accordance with claim 5, further comprising separating means arranged inside the outflow passages, said separating means preventing heated cooling medium from the rotor and directed outward through the outflow passages from coming into contact with the stator, said separating means comprising laminated separating cores oriented transversely to the axis of the turbo-generator, the laminated separating cores being at a distance from the walls of the stator and forming cooling slits between the cooling slits and the stator walls.

7. The turbo-generator in accordance with claim 6, further comprising preliminary stator slots, closure means, and first and second insert pieces, and wherein the cooling slits and the inflow slits are connected to the preliminary stator slots at their ends close to the axis, wherein the preliminary stator slots are closed off flush from the air gap by said closure means and form cooling passages through which the cooling medium flows, wherein the inflow slits are closed off flush toward the air gap by said first insert piece, and wherein the cooling slits of each outflow passage are closed off toward the air gap by said second insert piece.

8. The turbo-generator in accordance with claim 7, further comprising first and second distance webs, and wherein the laminated separating cores of the outflow passages are held at a distance from the walls of the stator by said first distance webs which laterally define the cooling slits between adjacent stator slots, wherein said second distance webs laterally define the inflow slits between adjacent stator slots and are arranged in the inflow slits.

9. The turbo-generator in accordance with claim 7, wherein the closure means comprises displacement bodies which project into the preliminary stator slots and reduce the cross section of flow in the preliminary stator slots.

10. The turbo-generator in accordance with claim 6 further comprising openings in the laminated separating cores for evening out the flow.

11. The turbo-generator in accordance with claim 6, wherein said stator comprises windings, and wherein the laminated separating cores have slots through which the stator conductors run, and wherein the width of the slots is selected so that slits for the circulation of the cooling medium remain free between the conductors and the laminated separating cores.

12. The turbo-generator in accordance with claim 5, further comprising bores arranged in the stator yoke and cooling passages arranged in the stator tooth, said bores and cooling passages running transversely to the inflow slits and outflow passages, each stator yoke bore and stator tooth cooling passage connecting adjacent inflow slits and outflow passages to one another.

13. The turbo-generator in accordance with claim 6, wherein the stator yoke bores and the stator tooth cooling passages each lead into the cooling slits at their ends facing the outflow passages.

14. The turbo-generator in accordance with claim 7, wherein said second insert piece has an open rectangular profile and edges rounded off toward the inside.

15. The turbo-generator in accordance with claim 8, wherein said first and second distance webs have openings therein, and wherein said openings in said first and second distance webs fluidly connect said outflow passages and inflow slits to adjacent preliminary stator slots.

\* \* \* \* \*